July 3, 1956 A. E. PINET 2,753,398

SIGNALLING SYSTEM FOR TELECOMMUNICATION SYSTEMS USING PULSE MODULATION

Filed Feb. 25, 1953 4 Sheets-Sheet 1

July 3, 1956 A. E. PINET 2,753,398

SIGNALLING SYSTEM FOR TELECOMMUNICATION SYSTEMS USING PULSE MODULATION

Filed Feb. 25, 1953 4 Sheets-Sheet 2

July 3, 1956 A. E. PINET 2,753,398

SIGNALLING SYSTEM FOR TELECOMMUNICATION SYSTEMS USING PULSE MODULATION

Filed Feb. 25, 1953 4 Sheets-Sheet 3

United States Patent Office 2,753,398

Patented July 3, 1956

2,753,398

SIGNALLING SYSTEM FOR TELECOMMUNICATION SYSTEMS USING PULSE MODULATION

André Eugene Pinet, Maisons-Alfort, France

Application February 25, 1953, Serial No. 338,815

Claims priority, application France March 13, 1952

12 Claims. (Cl. 179—15)

The present invention relates to a signal transmission system for signalling, applicable in telecommunication systems using pulse modulation, more particularly adapted to pulse modulation systems in which recurrent pulses are modulated in amplitude time position or duration by a signal to be transmitted, hereinafter called a "modulation signal." In such systems signalling, i. e. transmission of ringing or supervision signals, is generally effected by means of one of the following known methods. In accordance with a first known method, a particular voice frequency is assigned to signalling, a signalling signal of that frequency modulating the pulses at the sending end of the system in the same manner as the modulation signals. At the receiving end, the component of the demodulated signal having the frequency assigned to signalling is separated from the voice frequency components belonging to the modulation signal. This method requires the use of a special alternating current signalling voltage source.

In accordance with a second known method, signalling is effected by varying the value of the average amplitude of the pulses, the variation of which causes the operation of a suitable receiving device. In the latter case, the magnitude of the corresponding current component, in the absence of modulation, depends on the amplitudes of the pulses and on the ratio between their duration and their recurrence period. The sending device for signalling is so designed as to modify one of these two parameters.

In another known method, signalling is effected by modifying the amplitude of that component of the pulse signal which has the same recurrence frequency as the pulses. The magnitude of this component depends on the same parameters as the average amplitude of the pulses, but it may be more easily amplified than the latter and the receiving device for signalling requires only a lower sensitivity than in the case of the second known method referred to above. Since the said component has a frequency outside the band occupied by the modulation signals, this component is easier to filter than a voice frequency signal, which is an advantage over the first method mentioned above, the elimination of a special generator of alternating signalling voltage being a second advantage.

The invention uses the known method of signalling applicable in a multiplex time division pulse telecommunication system using recurrent pulses modulated in duration or time position by alternating current modulation signals, in which signalling is effected by modulating said pulses with a direct-current modulation at the sending end of said system. At the transmitting end of the system, signalling is then effected by causing the pulse to assume maximum duration, amplitude or time displacement. At the receiving end of said system, the method of operation of the device of the invention consists in locally creating channel selection pulses of constant duration and amplitude and having a constant frequency equal to the recurrence frequency of the received pulses (which can be done with the help of a pulse selector of any known type, consisting for instance of a local pulse generator synchronized with the average recurrence frequency of the received pulses); in deriving from said channel selection pulses a first and constant direct-current voltage independent of the modulation condition of said received pulses; in deriving from said received pulses and with the help of frequency selective means an alternating voltage of frequency equal to the recurrence frequency of said received pulses but having a magnitude depending upon the modulation condition of said received pulses; in rectifying said alternating voltage so as to obtain a second direct-current voltage and in combining in a suitable circuit said first and second direct-current voltages in opposition so as to obtain a combined direct-current voltage having a reduced value during transmission of modulation signals but having a larger value during transmission of signalling signals; and in applying said combined voltage to a utilization circuit, consisting for instance of an electron tube controlling a relay, the contacts of which when actuated close a further circuit eventually ensuring re-transmission of signalling signals.

The invention also provides apparatus for carrying out this method which comprises a common electron tube for amplifying both said modulation signals and said combined voltage, said tube comprising at least a cathode, a control grid and an anode, said combined voltage being applied to said control grid, the anode current of said tube operating a relay the contacts of which when actuated close a utilization circuit for signalling signals.

In a preferred embodiment of the apparatus according to the invention the said relay is a differential relay provided with two windings, the first of which is inserted in the anode circuit of said tube and the second of which is fed from a compensating current, the number of ampere-turns corresponding to said compensating current being substantially equal to half the average value of that existing in said first winding during transmission of modulation signals.

In another embodiment of the invention, more particularly adapted to pulse duration modulation, the first direct-current voltage is obtained across a resistance inserted in the cathode circuit of an electron tube having at least a cathode, a first and a second control grid and an anode and wherein one of said grids is supplied with received pulses of a given polarity and the second of said grids is supplied with locally produced periodic pulses of constant duration and of opposite polarity.

The invention will be better understood from the detailed description hereinafter given and with reference to the appended drawings wherein.

Figure 1:
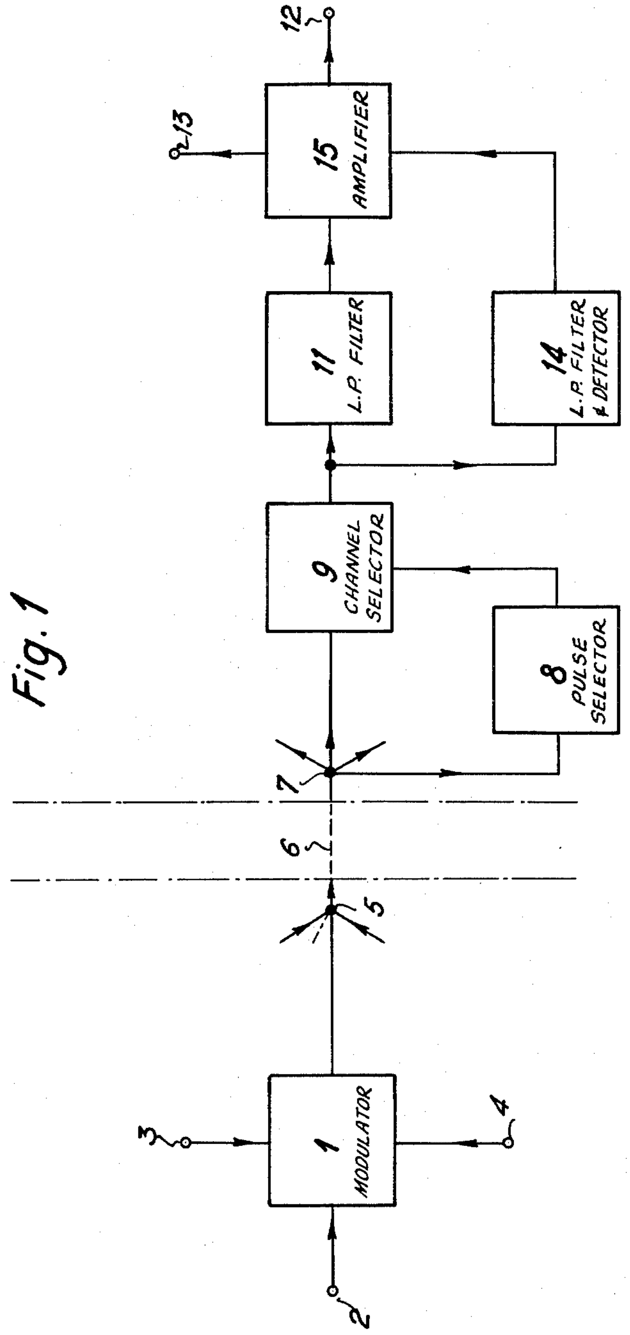
Figure 1 shows in block diagram, a signalling system according to the invention.

Referring to Figure 1, which is relative to a single transmission channel in a multiplex link, 1 designates a channel modulator provided with three input terminals: 2 to which the modulation signal is applied, 3 to which the signalling signal is applied, and finally, 4 to which are applied unmodulated pulses hereinafter called "sampling pulses," and with one output terminal 5 to which are connected the modulators of other channels, not shown, the said terminal 5 being connected to the sending end of a transmission line 6.

The receiving end 7 of that line 6 is connected to a synchronizing pulse selector 8 and to a channel selector 9 as well as to the selectors of other channels not shown.

In a known way, the synchronizing pulse selector 8 delivers channel unlocking pulses to the various channels, particularly to the channel selector 9.

The output of the channel selector 9 is connected to a low pass filter 11 for demodulating the pulses and to a circuit 14 comprising a band filter tuned to the pulse recurrence frequency and a detector. The demodulated modulation signals issuing from the filter 11 are applied to the input of an amplifier 15 which, in addition, has a second input corresponding to a gain control circuit to which the signal detected by the circuit 14 is applied. The amplifier 15 is provided with two outputs 12 at which the restituted modulation signal is obtained, and 13 at which is obtained a D. C. component. This component may assume two distinct values according to whether a signalling signal is being transmitted or not, and correlatively whether a detected voltage is applied or not to the input terminal used for controlling the gain of the amplifier 15. A signalling signal receiving device such as a relay passes to its working position for one of these values of the D. C. component received at 13 and remains at rest for the other value.

Figure 2:
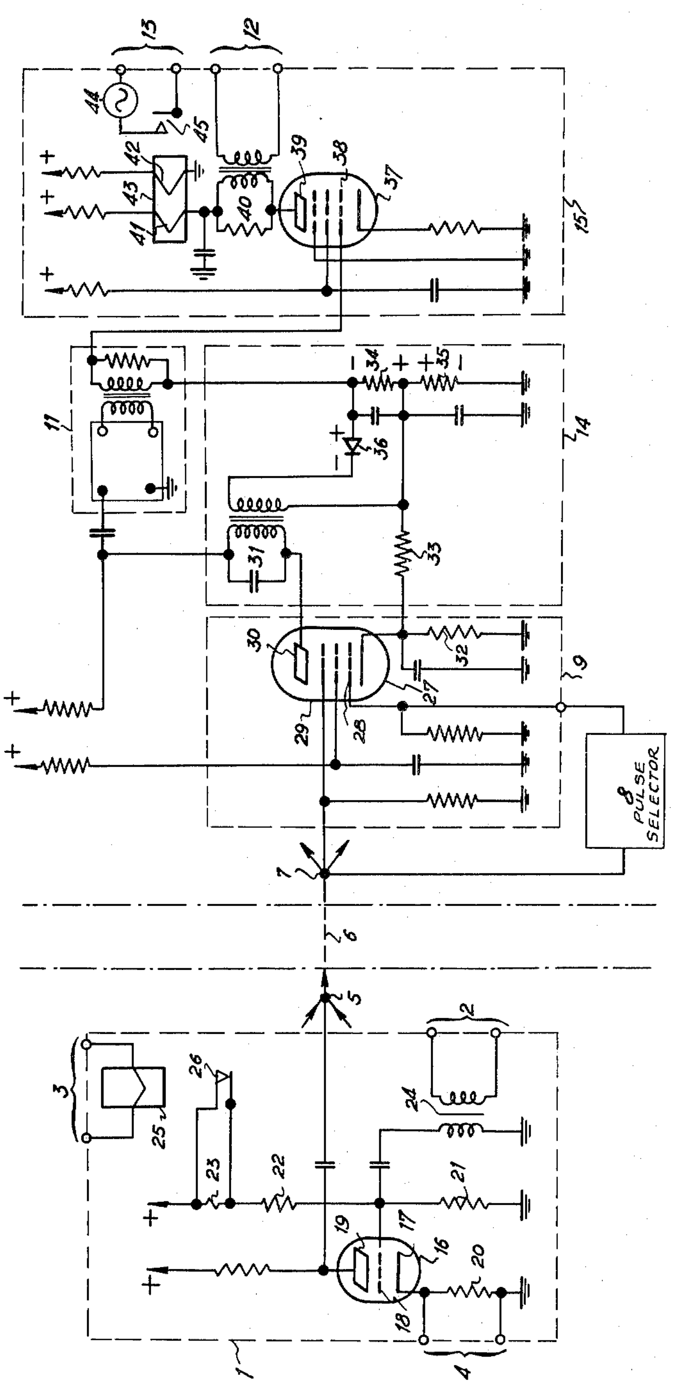
Figure 2 shows a detailed diagram of the circuits of the system of Figure 1, in the particular case when the pulses are modulated in duration.

Referring to Figure 2, the channel modulator 1 is assumed to be a pulse duration modulator and includes a triode tube 16, the cathode 17 of which receives sampling pulses from a local pulse generator applied to the terminals 4 and the control grid 18 of which, through the transformer 24, receives the modulation signal applied to the terminals 2. The sampling signal contacts, for instance, of a sequence of periodically recurrent negative pulses with a wave-shape resulting from the superposition of a rectangle and a saw tooth. The wave-shape of these pulses is shown on line *a* in Figure 3, at 101. In Figure 2, the anode 19 of the tube 16, is connected to the end 5 of the transmission line 6 which is also the mixing point for the various channel pulses.

The grid 18 is biassed by a voltage divider comprised of the resistors 21, 22 and 23. The values of these resistors and that of the resistor 20 in the cathode circuit are so selected, taking into account the amplitude characteristics of the pulse 101 of Figure 3, that in the absence of any modulation signal at 2, the grid 18 is sufficiently biassed for the anode current of the tube to remain zero during one half of the duration *t* of the said pulse 101. Under such conditions, there are obtained in the circuit of the anode 19 pulses 108 of a negative polarity, with a duration *t*/2.

Signalling currents applied at 3 energize the relay 25 which, through its make contact 26, short-circuits the resistor 23 of the voltage divider 21—22—23. The bias on the grid 18 is shifted in the direction of increasing potentials, whereby the potential of the grid 18 becomes high enough for an anode current to flow through the tube during the whole duration *t* of the pulse 101 and there are obtained, in the circuit of the anode 19, negative pulses 108 with a duration *t* which are applied to the transmission line at 5.

At the receiving end, the channel selector circuit 9 consists of a pentode tube 27, the suppressor grid 29 of which is connected with the receiving end 7 of the transmission line 6 and receives the channel pulses, and the control grid 28 of which is connected to the output of the synchronizing pulse selector circuits 8 and receives unlocking pulses from the latter channel. Circuits for accomplishing the functions of the circuit 8 are well known in the art and will not be described in detail here. It will only be recalled that they generally comprise a synchronizing pulse selector, circuit proper and a delay line on which tappings are distributed, going to the various channel selector circuits. The synchronizing pulse is sent into the delay line and, as it is passing opposite each tapping, a channel unlocking pulse is obtained which renders operative, for its duration, a particular channel selector circuit.

The circuit of the anode 30 of the tube 27 comprises a resonant circuit 31 and is connected to a low pass filter 11 which demodulates the duration modulated pulses and thus restores the modulation signal.

The resonant circuit 31 is tuned to the channel pulse recurrence frequency and at the terminals of this circuit, there is obtained a component of the received signal having the said recurrence frequency. This component is rectified by means of the rectifier 36 and applied to the terminals of the resistor 34. This resistor 34 is connected in series in the control grid circuit of the tube 37 of the amplifier 15 together with another resistor 35 and with the secondary winding of an output transformer fed from the above-mentioned low pass filter 11.

The resistor 35, together with a further resistor 33 forms a voltage divider to which the potential difference developed by the cathode current of tube 27 in the cathode resistor 32 is applied. This resistor 32 connects the cathode to a point at constant potential or "ground." The voltage at the terminals of resistor 35 tends to make the potential of the grid 38 of the tube 37 positive with respect to ground, while the voltage at the terminals of resistor 34 tends to make this same grid potential negative with respect to ground.

The tube 37 comprises, in the circuit of its anode 39, a transformer 40 at the terminals 12 of which the reconstituted modulation signal is found, and one of the two windings 41 of a differential relay 43. The second winding 42 of this relay is a compensation winding and it is permanently energized by a direct current supplied by the source of anode voltage for the tube. The "make" contact 45 of the relay 43 connects a source 44 of signalling (or ringing) current to the terminals 13 of an utilization circuit for signalling purposes.

Figure 3:
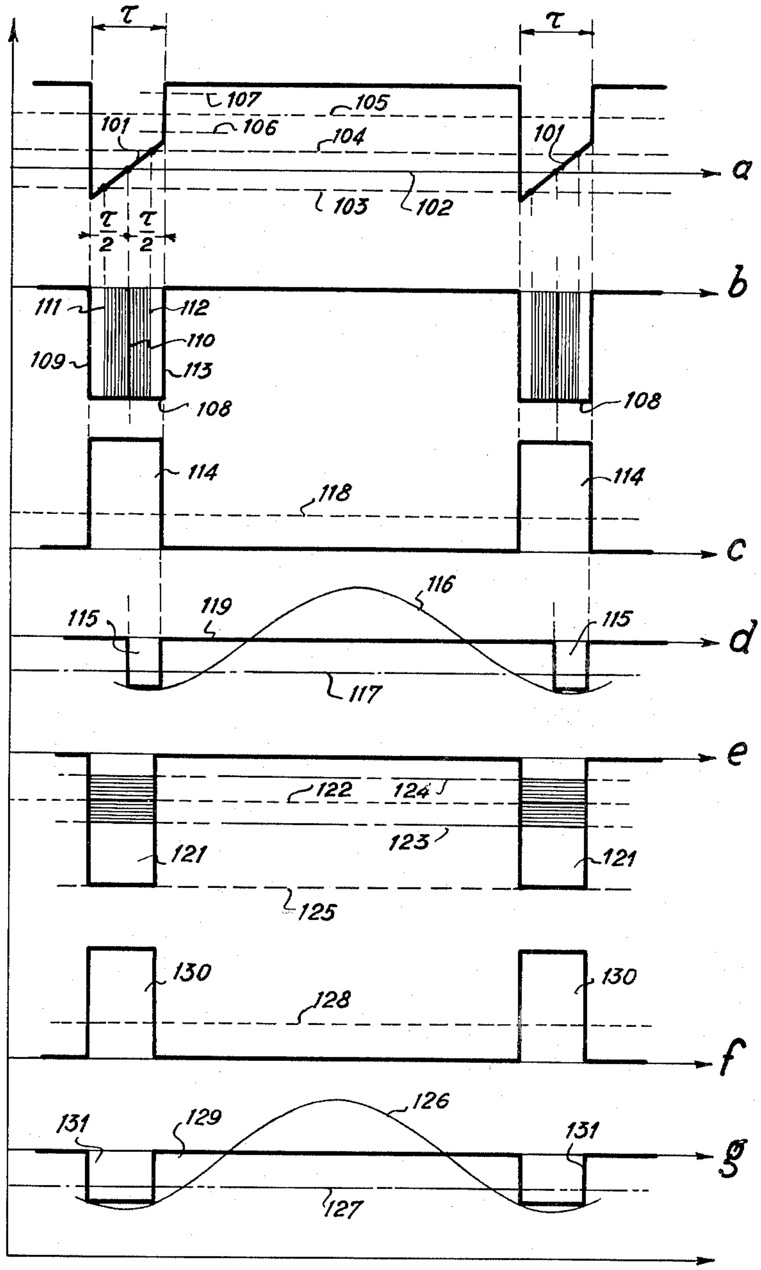
Figure 3 shows the signal wave shapes at various points of the circuits of Figure 2 and the wave shapes the signals would have if the pulses were amplitude-modulated.

The operation of the transmission system for signalling signals is as follows (Figure 3);

The sampling signal applied to the cathode 17 consists of pulses 101 which have an amplitude varying along a saw tooth curve between two pre-determined levels.

In the absence of signalling current and modulation signals, the potential of the grid 18 is that shown by the straight line 102 of line *a* of Figure 3 and the pulse 108 collected on the anode 19 has 109 as a leading edge and 110 as a trailing edge (line *b* of Figure 3) its duration being, under such conditions, equal to *t*/2.

In the absence of signalling current but in the presence of modulation signal, the potential of the grid 18 varies between the levels shown by the straight lines 103 and 104 of Fig. 3, line *a*, and the pulse 108 collected on the anode 19 has 109 as a leading edge and a trailing edge between 111 and 112 (line *b* of Figure 3).

In the presence of a signalling current, the potential of the grid 18 is that represented by the straight line 105 of Fig. 3 and the pulse 108 collected on the anode 19 has 109 as a leading edge and 113 as a trailing edge (line *b*) and, under these conditions, has a duration *t*. This duration remains equal to *t*, even if, simultaneously, there exists a modulation signal. The potential of the grid 18 then varies between the levels 106 and 107, which does not modify the duration *t* of the pulse 108. The channel pulses are assumed to be transmitted with a negative polarity.

At the receiving end of the system the channel unlocking pulse 114 is shown on part *c* of Fig. 3. It is assumed to be of a duration *t* and of positive polarity. The tube 27 is non-conducting when it simultaneously receives a positive channel unlocking pulse on its control grid 28 and a negative channel pulse on its suppressor grid 29. It becomes conducting, on the contrary, when its suppressor grid 29 no longer receives any channel pulse, and its control grid 28 receives a positive channel unlocking pulse. However, it must be remarked that, whatever be the condition of the signals applied to 29, there is always a voltage developed across 32, as long as positive unlocking pulses are applied to control grid 28, as, when there is no anode current in tube 27, an electron current still passes through the screen-grid of said tube and is found in its cathode circuit.

In the absence of signalling current, the pulse 108 has an average duration $t/2$ and the pulse 114 a duration $t$. The tube 27 would give, on a purely resistive load, the pulse 115 represented at line $d$ of Fig. 3 and, because of the presence of the resonant circuit 31, an alternating-current signal is obtained, at the terminals of the said circuit, having the sine wave shape shown at 116 on line $d$ of Fig. 3. Rectifications of this signal by the rectifier 36 gives, at the terminals of the resistor 34, an average rectified voltage shown by the straight line 117. On the other hand, the average voltage at the terminals of the resistor 35 is shown by the straight line 118. This average voltage 118 is equal and opposite to the average rectified voltage 117.

Under these conditions, the average anode current of the amplifier tube 37 has such a value that the numbers of ampere-turns in the windings 41 and 42 of the relay 43 are equal and this relay remains at rest.

In the presence of signalling current, the negative pulse 108 has a duration equal to that of the positive pulse 114. The anode circuit of the tube 27 is permanently locked. No signal is collected in the resonant circuit 31 and the voltage at the terminals of the resistor 34 is zero and is represented at 119. The bias of the grid 38 of the tube 37 is shifted in the positive direction by the sole action of the average voltage 118 across 35 (Figure 2). The anode current in this tube increases; the number of ampere-turns in the winding 41 of the relay 43 becomes larger than the number of ampere-turns in the winding 42; the contact 45 is closed on the generator 44 and a signalling current appears at the terminals 13 of an utilization circuit.

The connection method of the relay 43, as just described, may offer the drawback of untimely releasing in case the amplifier tube 37 stops operating. In such a case, only the compensation winding 42 is energized and the pulling force exerted on the relay armature is no longer zero. To obviate this drawback it is safer to design the windings 41 and 42 in such a manner that in the absence of signalling signals the number of ampere-turns in the winding 41 be twice that of the winding 42. The relay 43 is then permanently biassed by a force corresponding to a number of ampere-turns equal to that of the winding 42. It is sufficient to give the relay 43 such an adjustment that it remains at rest under these conditions. In this manner, an interruption in the operation of the tube 37 is not liable to cause untimely releasing of the relay 43, since the number of ampere-turns is not changed. Otherwise, nothing is changed in the operation of the relay in case a signalling signal is received.

It should be noted that in the receiving device there is opposed to the voltage resulting from the rectification, of the transmitted signal component having the recurrence frequency of the pulses, a voltage depending on the cathode current of tube 27. Ageing of this tube will simultaneously cause a decrease in the amplitude of the component at the pulse recurrent frequency due to the decrease in anode current and a decrease in the cathode current. The voltages developed at the terminals of the resistors 34 and 35 will both decrease, but will remain equal, which ensures a good stability in time of the device, hence reliability of operation.

Figure 4:
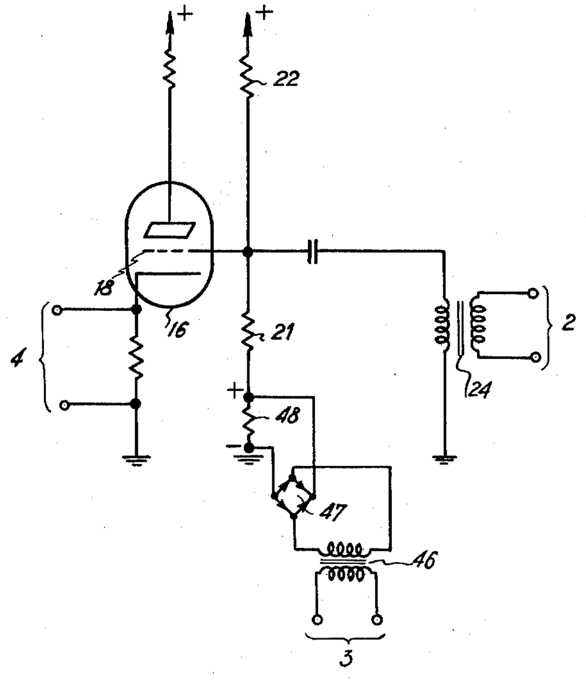
Figure 4 shows a modification of the sending portion of the diagram of Figure 2.

It has been assumed, in Figure 2, that the bias change of the grid 18 which causes the increase in the pulse duration is obtained by short-circuiting the resistor 23 under the action of the relay 25. In Figure 4, which constitutes a variant, an alternating ringing current is applied to terminals 3 of the primary winding of a transformer 46, the secondary winding of which is connected to a rectifier bridge 47. This rectifier bridge develops a direct voltage at the terminals of the resistor 48 which is part of the voltage divider 22—21—48, inserted between the high voltage source feeding tube 16 and ground. The polarity of the D. C. voltage at the terminals of 48 is such that it causes a shifting in the positive direction of the bias voltage of the grid 18 of the tube 16.

The signalling system just described in connection with Figure 2 in the case of pulse duration modulation may also be applied to the case of amplitude modulation.

On line $e$ of Figure 3, 121 represents the negative channel pulses. Their amplitude reaches the level 122 in the absence of signalling and in the case of zero modulation; it remains between the levels 125 and 124 in the absence of signalling but in the presence of modulation signals; it reaches the level 125 in the presence of signalling signals.

130 represents positive channel unlocking pulses and 128 the average terminal voltage across the resistor 35 (line $f$).

The tube 27 is conducting when it receives on its control grid a positive channel unlocking pulse, and on its suppressor grid, a negative channel pulse with an amplitude lower than a level between 123 and 125, i. e. it is conducting when the amplitude of the channel pulse reaches the level 125.

At the terminal of a pure resistance inserted in the anode circuit of the anode 30 of the tube 27, pulses 131 would be obtained when no signalling signal is transmitted and consequently at the terminal of the resonant circuit 31, a signal would be obtained having a sinusoidal wave shape 126. The average value of the voltage developed across the resistor 34 by this latter signal after its being rectified is represented by the straight line 127 (line $g$ of Fig. 3). This mean value is equal and opposite to that shown by the straight line 128. In the presence of signalling signals, the signal collected at the terminals of the circuit 31 is zero and is represented by the straight line 129. The bias voltage on the grid 38 is thus increased as well as the anode current in the tube 37 and the relay 43 operates.

Although the invention has been described with reference to definite examples of embodiment, it should be understood that modifications may be readily imagined by one skilled in the art and that they are within the scope of the present invention.

What is claimed is:

1. In a multiplex time division pulse communication system wherein intelligence is transmitted by modulating recurrent pulses for their duration by alternating current modulation signals and wherein signalling is effected by modulating said pulses with a direct-current modulation, a receiving device comprising means for deriving from received pulses channel selection pulses of constant amplitude and duration and having a constant frequency equal to the recurrence frequency of said pulses, means for deriving from said channel selection pulses a first and constant direct-current voltage, frequency selective means for deriving from said received pulses an alternating voltage having a frequency equal to said recurrence frequency and a magnitude depending on the modulation condition of said received pulses, means for deriving from said alternating voltage a second direct-current voltage, a circuit for combining said first and second direct-current voltages in opposition so as to obtain a combined direct-current voltage having a reduced value during transmission of said modulation signals but having a larger value during transmission of said signalling by said direct-current modulation, and means for applying said combined voltage to a utilization circuit.

2. A device as claimed in claim 1, wherein said first direct-current voltage is obtained across a resistance inserted in the cathode circuit of an electron tube having at least a cathode, a first and a second control grids and an anode, and wherein one of said grids is subjected to received pulses applied thereto with a given polarity and the second of said grids is subjected to said channel selection pulses applied with an opposite polarity, said alternating voltage being obtained across a circuit connected in the anode circuit of said tube.

3. A device as claimed in claim 1, comprising a common electron tube for amplifying said combined voltage and modulated signals derived from a demodulator fed from said received pulses, said tube comprising at least a cathode, a control grid and an anode, said combined voltage being applied to said control grid, the anode current of said tube operating a relay the contacts of which when actuated close said utilization circuit.

4. A device as claimed in claim 3, wherein said relay is a differential relay comprising a first winding inserted in the anode circuit of said tube and a second winding fed from a compensating current, the number of ampere-turns corresponding to said compensating current being substantially equal to half the average value of that existing in said first winding during transmission of modulation signals.

5. In a multiplex time division pulse communication system wherein intelligence is transmitted by modulating recurrent pulses for their amplitude by alternating current modulation signals and wherein signalling is effected by modulating said pulses with a direct-current modulation, a receiving device comprising means for deriving from received pulses channel selection pulses of constant amplitude and duration and having a constant frequency equal to the recurrence frequency of said pulses, means for deriving from said channel selection pulses a first and constant direct-current voltage, frequency selective means for deriving from said received pulses an alternating voltage having a frequency equal to said recurrence frequency and a magnitude depending on the modulation condition of said received pulses, means for deriving from said alternating voltage a second direct-current voltage, a circuit for combining said first and second direct-current voltages in opposition so as to obtain a combined direct-current voltage having a reduced value during transmission of said modulation signals but having a larger value during transmission of said signalling by said direct-current modulation, and means for applying said combined voltage to a utilization circuit.

6. A device as claimed in claim 5, wherein said first direct-current voltage is obtained across a resistance inserted in the cathode circuit of an electron tube having at least a cathode, a first and a second control grids and an anode, and wherein one of said grids is subjected to received pulses applied thereto with a given polarity and the second of said grids is subjected to said channel selection pulses applied with an opposite polarity, said alternating voltage being obtained across a circuit connected in the anode circuit of said tube.

7. A device as claimed in claim 5, comprising a common electron tube for amplifying said combined voltage and modulated signals derived from a demodulator fed from said received pulses, said tube comprising at least a cathode, a control grid and an anode, said combined voltage being applied to said control grid, the anode current of said tube operating a relay the contacts of which when actuated close said utilization circuit.

8. A device as claimed in claim 7, wherein said relay is a differential relay comprising a first winding inserted in the anode circuit of said tube and a second winding fed from a compensating current, the number of ampere-turns corresponding to said compensating current being substantially equal to half the average value of that existing in said first winding during transmission of modulation signals.

9. In a multiplex time division pulse communication system wherein intelligence is transmitted by modulating recurrent pulses for their time position by alternating current modulation signals and wherein signalling is effected by modulating said pulses with a direct-current modulation, a receiving device comprising means for converting time modulated received pulses into duration modulated pulses, means for deriving from said received pulses channel selection pulses of constant amplitude and duration and having a constant frequency equal to the recurrence frequency of said pulses, means for deriving from said channel selection pulses a first and constant direct-current voltage, frequency selective means for deriving from said converted pulses an alternating voltage having a frequency equal to said recurrence frequency and a magnitude depending on the modulation condition of said received pulses, means for deriving from said alternating voltage a second direct-current voltage, a circuit for combining said first and second direct-current voltages in opposition so as to obtain a combined direct-current voltage having a reduced value during transmission of said modulation signals but having a larger value during transmission of said signalling by said direct-current modulation, and means for applying said combined voltage to a utilization circuit.

10. A device as claimed in claim 9, wherein said first direct-current voltage is obtained across a resistance inserted in the cathode circuit of an electron tube having at least a cathode, a first and a second control grids and an anode, and wherein one of said grids is subjected to received pulses applied thereto with a given polarity and the second of said grids is subjected to said channel selection pulses applied with an opposite polarity, said alternating voltage being obtained across a circuit connected in the anode circuit of said tube.

11. A device as claimed in claim 9, comprising a common electron tube for amplifying said combined voltage and modulated signals derived from a demodulator fed from said received pulses, said tube comprising at least a cathode, a control grid and an anode, said combined voltage being applied to said control grid, the anode current of said tube operating a relay the contacts of which when actuated close said utilization circuit.

12. A device as claimed in claim 11, wherein said relay is a differential relay comprising a first winding inserted in the anode circuit of said tube and a second winding fed from a compensating current, the number of ampere-turns corresponding to said compensating current being substantially equal to half the average value of that existing in said first winding during transmission of modulation signals.

No references cited.